March 8, 1932. A. M. PEIFFER ET AL 1,848,903
AUTOMATIC AUTOMOBILE STOP FOR RAILWAY CROSSINGS
Filed Feb. 16, 1931 2 Sheets-Sheet 1
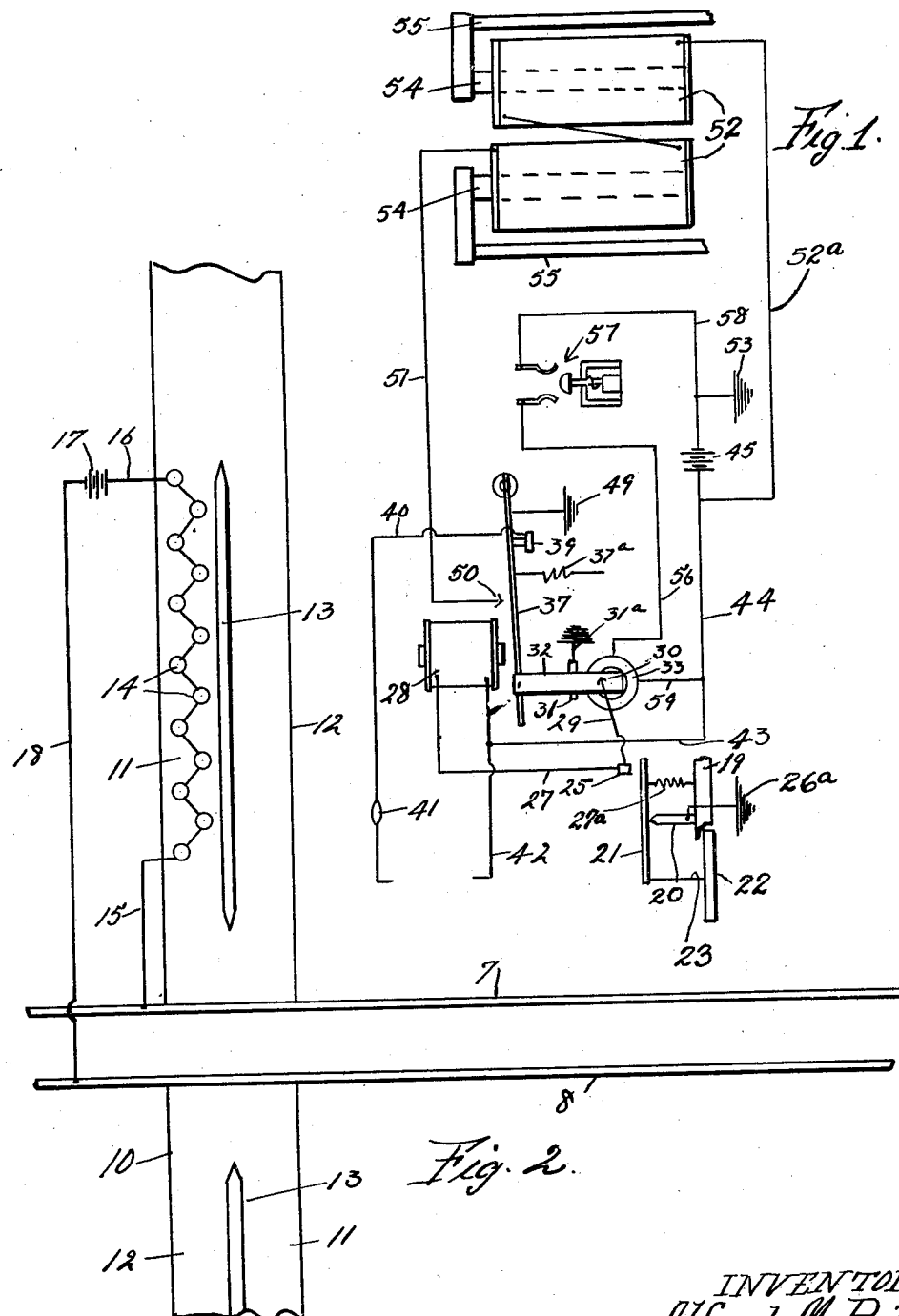
INVENTORS
Alfred M. Peiffer
Harold C. Roeder
By W. W. Williamson Atty.

March 8, 1932. A. M. PEIFFER ET AL 1,848,903
AUTOMATIC AUTOMOBILE STOP FOR RAILWAY CROSSINGS
Filed Feb. 16, 1931 2 Sheets-Sheet 2
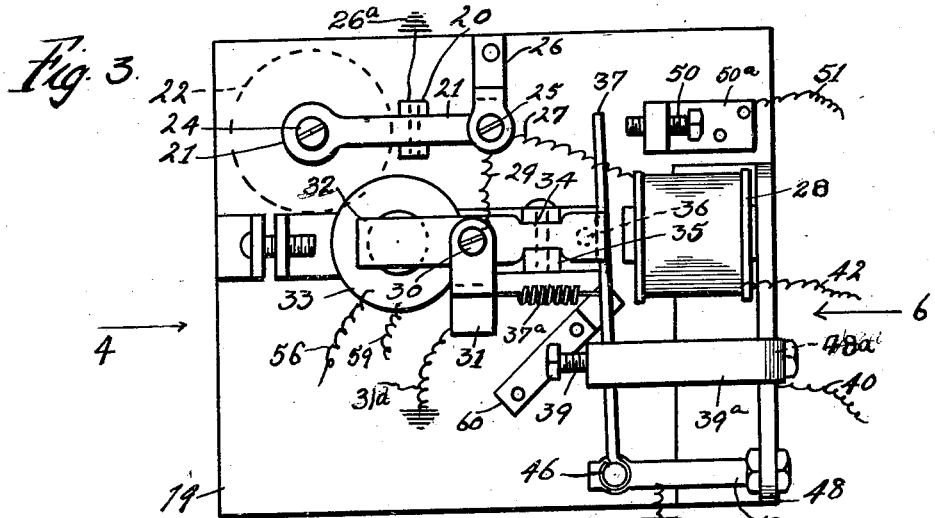
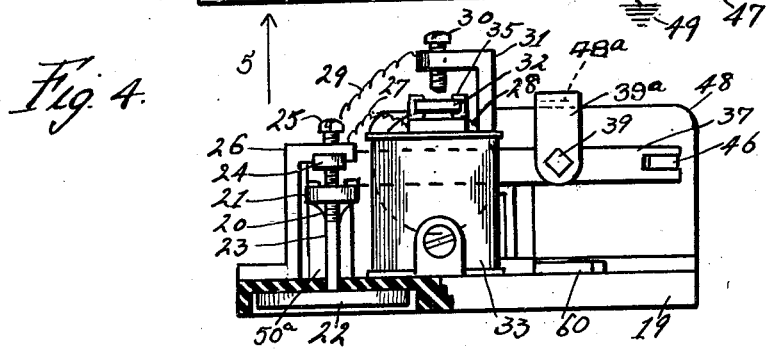
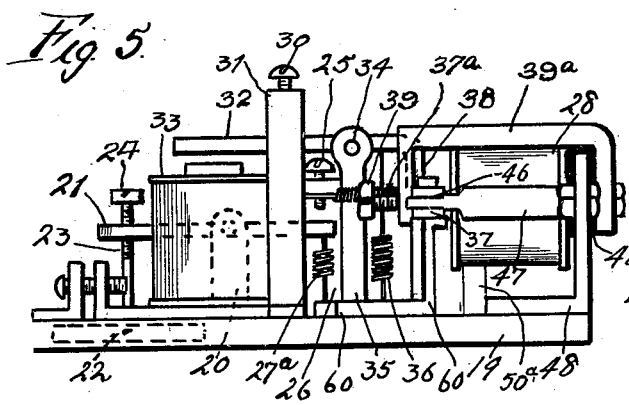
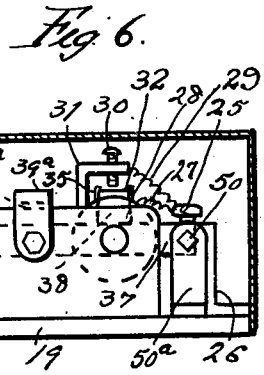
INVENTORS
Alfred M. Peiffer
Harold C. Roeder
By W. W. Williamson Atty.

Patented Mar. 8, 1932

1,848,903

UNITED STATES PATENT OFFICE

ALFRED M. PEIFFER AND HAROLD C. ROEDER, OF SKUYLKILL HAVEN, PENNSYLVANIA

AUTOMATIC AUTOMOBILE STOP FOR RAILWAY CROSSINGS

Application filed February 16, 1931. Serial No. 515,967.

Our invention relates to new and useful improvements in an automatic automobile stop for railway crossings, the principal object of which is to provide an equipment for the railroad tracks at a crossing and having a portion located in the roadway to act upon certain equipment carried by an automobile to open the ignition circuit and cause an application of the brakes.

Another object of the invention is to provide an exceedingly simple and effective crossing equipment in which certain electromagnetic means will be energized upon the approach of a train whereby certain equipment on an automobile will be acted upon to place it in condition for opening the ignition circuit and causing an application of the brakes of said automobile.

A further object of our invention is to provide an equipment for an automobile including solenoids, the cores or movable parts of which are connected with a brake or brakes of the automobile so that when the coils are energized, the movable parts will be actuated to cause an application of the brakes, said equipment also including means for making and breaking the ignition circuit, and means for primarily closing a circuit which will place the device in operation when the automobile runs into the field of action of the crossing equipment, providing the latter is active.

With these ends in view, this invention consists in the details of construction and combination of elements hereinafter set forth and then specifically designated by the claims.

In order that those skilled in the art to which this invention appertains may understand how to make and use the same, we will describe its construction in detail, referring by numerals to the accompanying drawings forming a part of this application, in which:—

Fig. 1 is a diagrammatic view of the several electrical circuits included in the automobile equipment.

Fig. 2 is a diagrammatic view of the combined track and roadway or crossing equipment illustrating but a single track and the equipment installed in but one path of travel of an automobile on the roadway.

Fig. 3 is a plan view of the actual control mechanism for the several circuits to be installed on an automobile.

Fig. 4 is a side elevation looking toward the device as indicated by arrow 4 in Fig. 3 with the portion broken away to illustrate a detail of construction.

Fig. 5 is a similar view looking toward the device as indicated by the arrow 5 in Fig. 3.

Fig. 6 is also a side elevation on a reduced scale looking toward the device as shown by arrow 6 in Fig. 3 with a cover or enclosure shown thereon in section.

In carrying out the invention as herein embodied, 7 and 8 represent the rails of a railway track properly electrically bonded and suitable portions insulated to provide a block into which a train will enter to cause an operation of the roadway equipment, while 10 denotes the roadway. If found desirable, the roadway adjacent the crossing may be divided into two paths of travel 11 and 12 by a barrier 13.

In the roadway are located and installed one or more electro-magnets 14 positioned in any suitable arrangement to accomplish the desired results. While we have illustrated the electro-magnets as being located directly in the road bed, it is obvious that they could be located on suitable supports at the sides of the road or along the barrier 13 or otherwise according to the positioning of the automobile equipment.

The electro-magnets 14 are included in a normally open circuit which circuit also includes a conductor 15 connecting one of the rails, as 7, with the electro-magnet or magnets, a conductor 16 connecting the electromagnet or magnets with a source of electrical energy 17 and another conductor 18 connecting said source 17 with the other rail, as 8, of the track. It will now be obvious that when a train or vehicle running upon the track enters the block which has its rails electrically connected with the electro-magnet or magnets said magnets will be energized for acting upon a part of an equipment to be hereinafter described.

The automobile equipment includes a suitable supporting base 19 here shown as of insulating material and it will be readily understood that where said base is not of insulating material, it will be necessary to insulate most, if not all, of the metallic parts, as a great many of them are used in the several electrical circuits. On the base may be mounted a standard 20 to support a lever 21 which is pivoted intermediate its ends on the standard and one end of said lever has an armature 22 depending therefrom and positioned below the base 19 and said armature is preferably provided with a shank 23 threaded through the lever 21, said shank having a head 24 by which it may be rotated for adjusting the armature 22 relative to the lever. The other end of the lever 21 is arranged for coaction with a contact 25 preferably in the form of a screw and having threaded connection with a bracket 26 mounted on the base 19. The parts thus far described produce an electric switch having an armature through the medium of which said switch is closed when the armature is attracted by the electro-magnet or magnets 14 located in the roadway and said switch is normally maintained in an open condition by a spring 27a.

In other words a normally open spring actuated switch is provided having an armature by which it may be closed but any other suitable form of switch may be substituted.

The movable part of the switch is grounded on the automobile chassis as at 26a or one side of said switch is grounded while the other side represented by the contact 25 and bracket 26 is connected by a conductor 27 with the coil or windings of the electro-magnet 28 and said other side of the switch is also connected by a conductor 29 with the contact 30, as through the bracket 31 which is mounted on the base 19 and grounded as at 31a or in any other suitable manner, connected with a source of electricity and said contact 30 is preferably in the form of a screw threaded into the bracket 31 and with which cooperates the lever 32 acting as the other part of the switch and also as the armature to permit actuation of the switch in one direction, under certain conditions, by an electro-magnet 33 with which the lever 32 is associated. Said lever is pivoted intermediate its ends as at 34 to a suitable standard or bracket 35 and is actuated by the spring 36 in that direction which will move one end of the lever 32 into engagement with the contact 30.

The lever 32 is adapted to be held in a position which will retain the switch, comprising said lever 32 and the contact 30, open even though the electro-magnet 33 does not remain energized, by a switch lever 37 when the said lever is moved outward or away from its electro-magnet 28 by the spring 37a, and therefore, we have shown, but only for convenience of illustration, the lever 32 as provided with a down-turned finger 38 to rest upon the upper edge or top of the lever 37 when the latter is in engagement with the contact 39 having threaded connection with the arm 39a supported by the angle iron 48 but insulated therefrom by suitable insulating material 48a and said contact 39 and component parts constitute one side of a switch from which leads a conductor 40 to one side of the ignition system of the automobile (not shown) and more particularly said conductor 40 may lead to one side of the ignition switch 41. Since the tension of the spring 36 is acting upon the switch lever 37 when the switch lever 32 is in engagement with said switch lever 37, a guard or support 60 fastened to the base 19 underlies the switch lever 37 to prevent undue depression thereof. The other side of the ignition system is connected by a conductor 42 with the electro-magnet 28 and both said other side of the ignition system and the electro-magnet 28 are connected, as through a conductor 43 and a conductor 44 with one side of the source of electrical energy 45, such as the battery of the automobile.

The lever 37 of the ignition and brake controlling switch may be pivoted at one end as indicated at 46 to any suitable supporting element or elements, here shown as a post 47, which in turn is supported by an angle iron or bracket 48 and said lever 37 is electrically grounded on the automobile chassis as indicated at 49.

Associated with the switch lever 37 is a contact 50 located in a bracket 50a so that when said lever is moved out of engagement with the contact 39 due to said lever being pulled toward the electro-magnet 28 by said magnet, of which the lever 37 is the armature, the latter will engage said contact 50 which is connected by a conductor 51 with one or more solenoids 52 and where there are a plurality of solenoids they are connected in series and then by a conductor 52a with one side of the source of electrical energy 45, the other side of said source being grounded as at 53 on the automobile chassis.

Each solenoid includes a movable member, plunger or core 54 which will be drawn in to the winding when the latter is energized and each movable member, plunger or core has a link or connection 55 attached thereto and in some suitable manner connected with the brake system of the automobile (not shown) to cause an application of the brakes when the solenoid or solenoids are energized.

The electro-magnet 33 which actuates the lever 32 of the resetting switch in one direction and under certain conditions is connected by a conductor 56 to one side of a normally open spring-actuated switch 57, which must be manually operated to close the circuit through the electro-magnet 33 and the other side of the switch 57 and is connected by a conductor 58 with one side of the source of electrical energy 45 which may be suitably grounded. The other side of the source 45 is connected with the electro-magnet as through the conductor 44 and a conductor 59.

From the foregoing description, it will be obvious to those skilled in the art that the operation is as follows:—

The parts being at rest as herein illustrated, particular reference being had first to Fig. 1, upon closing the ignition switch 41, as usual, the ignition circuit is closed from one side of the source of electrical energy 45, thence through conductors 44 and 43 and a part of conductor 42 to the ignition system (not shown) and then through the conductor 40 including the switch 41 to contact 39, switch lever 37 and the ground connections 49 and 53 to the opposite side of the source of electrical energy 45.

Upon entrance of a train or vehicle into the safety block of the track upon which the electro-magnetic means 14 are electrically connected, said means will be energized and upon the entrance of a vehicle equipped with this invention into the field of attraction of the electro-magnetic means 14, the armature 22 will be attracted toward said electro-magnetic means 14 so as to actuate the movable part of the switch including elements 21 and 25 thereby closing an electric circuit from one side of the source of electrical energy 45 through the ground connections 53 and 26a, thence through the above mentioned switch, which includes elements 21 and 25, conductor 27, electro-magnet 28, a part of conductor 42, conductors 43 and 44, back to the other side of the source of electrical energy 45.

This will cause the switch lever 37 to be attracted to the electro-magnet 28 opening the ignition circuit between the lever 37 and the contact 39 causing the motor of the automobile to stop. The movement of the lever 37 from beneath the lever 32 will permit the spring 36, Fig. 5, to move the lever 32 until it engages the contact 30, thereby completing a secondary circuit through the electro-magnet 28 even though the automobile "drifts" past the field of attraction of the electro-magnetic means 14 and permits the switch including parts 21 and 25 to be opened by the spring 27a. Said secondary circuit through the electro-magnet 28 will then include one side of the source of electrical energy 45, the ground connections 53 and 31a, the support or standard 31, lever 32, contact 30, conductor 29, contact 25, conductor 27, electro-magnet 28, a part of conductor 42 and conductors 43 and 44 back to the other side of the source of electrical energy 45.

The movement of the switch lever 37 to open the ignition circuit will carry said switch lever 37 into engagement with the contact 50 thereby closing a circuit from one side of the source of electrical energy 45 through the ground connections 53 and 49, the switch lever 37, contact 50, conductor 51, the windings of the solenoid or solenoids 52, the conductor 52a back to the other side of the source of electrical energy, here shown as through conductor 44. The closing of the last mentioned circuit will energize the coil or coils of the solenoid or solenoids and retract the plunger or plungers 54 so as to impart a movement to the link or connecting means 55 to cause an application of the brakes to bring the automobile to a stand-still before reaching the actual crossing of the railroad track and roadway.

After the train has passed and it is safe to proceed, the switch 57 is manually operated against the action of its spring and closing circuit from one side of the source of electrical energy 45 through conductor 58, said switch 57, conductor 56, electro-magnet 33, and conductors 59 and 44 back to the other side of the source of electrical energy. The closing of this circuit will energize the electro-magnet 33 and move the switch lever 32 in a reverse direction or to an inoperative or open position, thereby opening the circuit through the electro-magnet 28 at the point of engagement between the lever 32 and the contact 30. This action having removed the lever 32 out of the path of backward travel of the lever 37 and de-energizing the electro-magnet 28, said lever 37 will be acted upon by its spring 37a to move said lever 37 backward thereby opening the circuit through the solenoid means and closing the circuit to the ignition system. As soon as this has been accomplished, which is practically instantaneous, the switch 57 is released so as to be spring-actuated for opening the circuit through the electro-magnet 33 thereby permitting the spring 36 to move the lever 32 to a rest position on the lever 37 but will not move said lever 32 into engagement with the contact 30. Thus it will be seen that upon de-energization of the electro-magnetic means 14, the automatic control or stop mechanism carried by the automobile may be readily reset by simply actuating the switch 57 and so long as the automobile is in the field of attraction of the electro-magnetic means 14, said mechanism cannot be reset to close the circuit of the ignition system or release the brakes since the primary or initial circuit through the electro-magnet 28 will be maintained through the switch including the elements 21 and 25.

Of course we do not wish to be limited to the exact details of construction as herein shown, as these may be varied within the limits of the appended claims without departing from the spirit of our invention.

Having thus fully described our invention, what we claim as new and useful is:—

1. In an apparatus for preventing accidents at railroad crossings, means for producing an electro-magnetic zone in a highway a distance from the railway, an automobile control mechanism to be mounted upon an automobile including a solenoid or solenoids to cause an application of the automobile brakes, a source of electrical energy, a double-throw switch common to both of said circuits and spring-actuated to normally maintain the circuit connected with the ignition system in a closed condition and the solenoid circuit open, electro-magnetic means for actuating the double-throw switch, a single-throw switch, an electrical circuit including said source of electrical energy, the electro-magnetic means associated with the double-throw switch and the single throw-switch, the latter being normally maintained in an open condition, and an armature carried by the single throw switch to be influenced by the electro-magnetic means in the roadway to initially close the circuit through the electro-magnetic means associated with the double-throw switch.

2. The structure set forth in claim 1 in combination with a second single throw switch, the source of electrical energy and the electro-magnetic means associated with the double-throw switch, said second named single throw-switch being held in an open position by the movable part of the double-throw switch and when released closing the circuit through the electro-magnetic means associated with the double-throw switch after the circuit through the first mentioned single throw switch has been opened.

3. In an apparatus for preventing accidents at railroad crossings, means for producing an electro-magnetic zone in a highway a distance from the railway, an automobile control mechanism to be mounted upon an automobile including a solenoid or solenoids to cause an application of the automobile brakes, a source of electrical energy, a double-throw switch common to both of said circuits and spring-actuated to normally maintain the circuit connected with the ignition system in a closed condition and the solenoid circuit open, electro-magnetic means for actuating the double-throw switch, a single-throw switch, an electrical circuit including said source of electrical energy, the electro-magnetic means associated with the double-throw switch and the single throw-switch, the latter being normally maintained in an open condition, an armature carried by the single throw switch to be influenced by the electro-magnetic means in the roadway to initially close the circuit through the electro-magnetic means associated with the double-throw switch, a second single throw switch spring-actuated in one direction tending to close the same and coacting with the movable part of the double-throw switch to be held in an open condition against the action of the spring when the double-throw switch is in its normal position, a circuit including the second named single throw switch, the electro-magnetic means associated with the double-throw switch and said source of electrical energy, said second named single throw switch closing the last named circuit upon release of the second named throw switch due to actuation of the double-throw switch whereby a closed circuit will be maintained through the electro-magnetic means associated with the double-throw switch after the circuit through the first mentioned single throw switch has been opened, electro-magnetic means associated with the second named single throw switch, and a normally open circuit including the electro-magnetic means associated with the second named single throw switch and said source of electrical energy which when closed will open said second named single throw switch thereby de-energizing the electro-magnetic means associated with the double-throw switch permitting the latter to open the solenoid circuit and close the ignition circuit and cause the movable part of the double throw switch to co-operate with the movable part of the second named single throw switch to normally maintain the latter in the open position.

4. The structure set forth in claim 3 in combination with a spring-actuated normally open switch in the circuit including the electro-magnetic means associated with the second named single throw switch to be manually operated for temporarily closing the circuit through the said electro-magnetic means associated with the second mentioned single throw switch to permit the parts to return to their normal positions and permit the several electrical circuits to assume their normal conditions.

5. A source of electrical energy, electromagnets located in a roadway near the intersection thereof with a railway, means for electrically connecting the electro-magnets with the source of electrical energy, said means including the rails of the railway for closing a circuit through an approaching railway vehicle, said rails, the source of electrical energy and the electro-magnets, whereby the approaching railway vehicle energizes the magnets, a control device to be mounted on an automobile including a solenoid or solenoids, means to connect the movable part or parts of said solenoid or solenoids with the brakes of the automobile for causing an application of said brakes upon energization of the solenoid or solenoids, a source of electrical energy on the automobile, an electric circuit including said source and the electromagnets, another electrical circuit including the ignition system of the automobile and said source, a double-throw switch associated with both of said circuits and spring-actuated in one direction to normally maintain the circuit to the ignition system closed and the circuit including the solenoids open, an electromagnet associated with the movable part of the double-throw switch which when energized will move the double-throw switch against the action of its spring to open the normally closed circuit and close the normally open circuit, a single throw switch spring-actuated in one direction to normally maintain the same open, an armature carried by said single throw switch to be influenced by the electro-magnets in the roadway for closing the single throw switch against the action of its spring, a secondary circuit included in the solenoid associated with the double-throw switch, the second named single-throw switch and the source of electrical energy, said secondary circuit being closed by the second named single-throw switch upon dis-engagement of the movable part of the double-throw switch from the movable part of the second-named single-throw switch, electro-magnetic means associated with the second named single-throw switch which when energized will open said second-named single-throw switch, thereby de-energizing the electro-magnet associated with the double-throw switch and permitting the movable part of the latter to re-engage the movable part of the second-named single throw switch to hold the same in an open position, a manually operable switch spring-actuated in one direction to normally maintain it in an open condition, and an electrical circuit including said manually operable switch, the electromagnet associated with the second named single-throw switch and the source of electrical energy which when temporarily closed will energize the electro-magnet associated with the second named single throw-switch.

6. In an apparatus for preventing accidents at railroad crossings, means for producing an electro-magnetic zone in the highway a distance from the railway, an automobile control mechanism to be mounted upon an automobile and including a solenoid or solenoids to cause an application of the automobile brakes, a source of electrical energy, a two-way switch spring actuated in one direction, an electrical circuit including said source, one side of the switch and said solenoid or solenoids, a second electrical circuit including said source and the other side of said switch, said second named circuit to be connected in series with the automobile ignition system, electro-magnetic means co-acting with the two-way switch to operate the same against the action of the spring, a second switch also spring actuated in one direction, an armature carried by said second switch to be affected by the electro-magnetic means in the highway for actuating said second switch, and an electrical circuit including the source of electrical energy, the electro-magnetic means associated with the two-way switch and said second switch.

In testimony whereof, we have hereunto affixed our signatures.

ALFRED M. PEIFFER.
HAROLD C. ROEDER.